Dec. 9, 1958 L. D. SEADER 2,864,078

PHASED, TIMED PULSE GENERATOR

Filed Sept. 28, 1955 3 Sheets-Sheet 1

INVENTOR.
LEONARD D. SEADER
BY
John B. Sponsler
AGENT

PHASED, TIMED PULSE GENERATOR

Filed Sept. 28, 1955

3 Sheets-Sheet 3

United States Patent Office 2,864,078

Patented Dec. 9, 1958

2,864,078

PHASED, TIMED PULSE GENERATOR

Leonard D. Seader, Santa Clara, Calif., assignor to International Business Machines Corporation, New York, N. Y., a corporation of New York Application September 28, 1955, Serial No. 537,260

13 Claims. (Cl. 340—174)

This invention relates to magnetic recording devices similar to those shown in copending application Serial No. 477,468, filed December 24, 1954. More particularly, this invention is directed to a novel arrangement for recording and reproducing a plurality of recorded data registrations upon a cyclically moving record such as a magnetic drum.

It is well known in the magnetic recording art to record coded magnetic pulse representations of informational data upon a moving recording medium such as a drum or disc rotating at a constant speed. Normally, the practice is to selectively record data pulses or bits in timed sequence upon a continuous path of the aforesaid drum or disc making use of a timing track, sometimes referred to as a "clock track," whereby the intervals of the pulses or bits are determined, as, for example, in U. S. Patents 2,587,532 and 2,611,813. Clock tracks however, have limitations relative to the accuracy of the pulses derived therefrom and the drift in recording from these pulses, particularly where more than one cyclic record carrier is used with a common clock track, where the transducer is moved to and from the recording path or where more than one reading/recording station is employed upon a common recording path. Furthermore, the use of a clock track requires transducer and amplifier components and circuits in addition to those required for reproducing data pulses, thereby increasing the cost and complexity of the recording apparatus.

In the present invention a novel timing arrangement is shown for use with magnetic recording devices and the like wherein no clock track is required.

The primary object of this invention, therefore, is to provide an improved timing means for effecting the reading and recording of data upon a cyclic record medium.

A further object of the invention is to provide a timing means for distinguishing the intervals of pulses or bits of recorded data under direct control of the data pulses per se.

A still further object of the invention is to provide a novel timing means in a magnetic recorder wherein the timed sequence of recorded bits of data is phased automatically with the occurrence of the data.

Another object is to provide a novel pulse generator for furnishing phased, timed pulses in connection with a magnetic recording device.

Still another object of the invention is to provide a data pulse timing arrangement wherein the data pulse phase is corrected each time a data bit is sensed.

Other objects of the invention will be pointed out in the following description and claims and illustrated in the accompanying drawings which disclose, by way of example, the principle of the invention and the best mode which has been contemplated of applying that principle.

Figure 1:
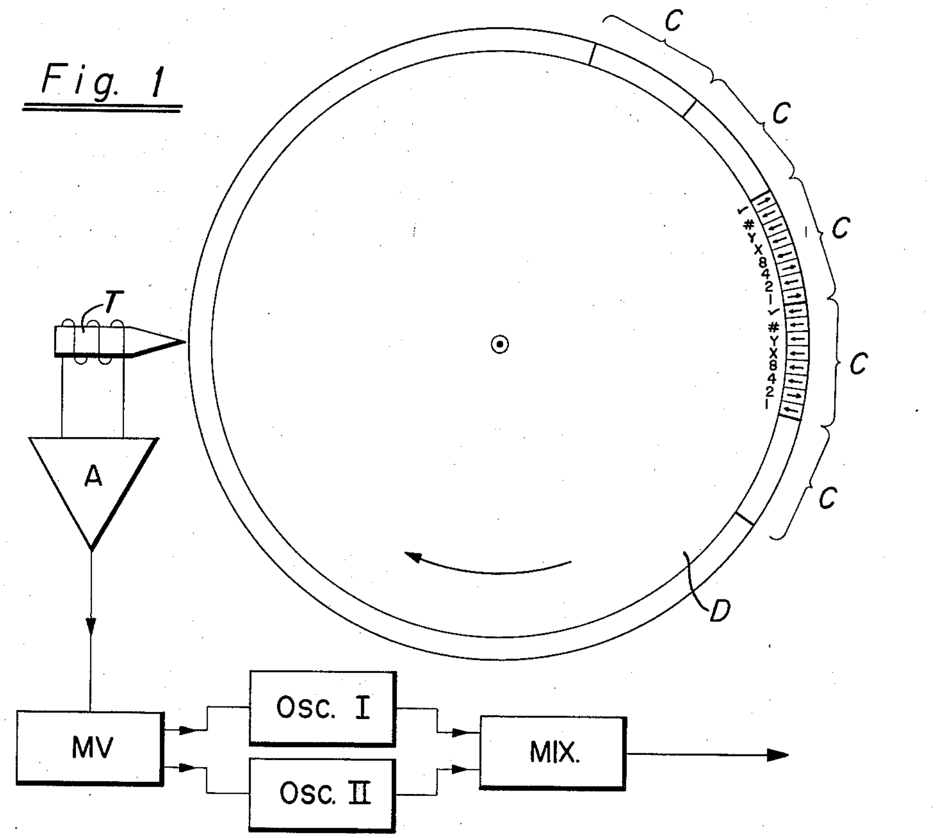
Fig. 1 is a diagrammatic view of the invention as embodied in a magnetic drum or disc recording device.

Referring now to Fig. 1, there is shown a disc D upon which a magnetic path is provided wherein data information can be recorded and reproduced, as, for example, in the positions labeled C. Each of the positions is represented by a series of coded bits in such a manner that the identification of the character in each of the positions C is indicative of the character which is to be recorded and reproduced. The magnetic track or path may be coded in any arrangement well known in the art; however, in the embodiment shown an arbitrary code of 1, 2, 4, 8, X, Y, #, and "check" is capable of being recorded and reproduced in its respective bit positions of which there are a total of eight. Any type of recording may be used in practicing this invention.

As has been previously mentioned, it is normal practice in magnetic recording upon a cyclically moving record medium to use a clock track whereby the data bits are recorded in timed relation upon a track or path of the record medium. In the present invention no clock track is used; however, advantage is taken of certain characteristics inherent in bi-stable multivibrators or triggers controlling oscillators which give off a series of evenly spaced pulses. Again referring to Fig. 1, a transducer T is shown coacting with the magnetic record path of the drum D. Any data bit (see small arrows in the recording path which point radially outwards from the center of the drum D) which is carried past the transducer T causes a voltage pulse to be generated therein in a manner well understood in the magnetic recording art. The output of transducer T is fed into a conventional vacuum tube amplifier A, the output of the amplifier being fed into a multivibrator of the bi-stable type commonly referred to as a trigger. The output of amplifier A fed to the trigger MV is arranged to shift the trigger into one of its two stable states each time a pulse is received by the transducer T. In one condition of stability the trigger MV will cause an oscillator I to be turned on, and in the other condition of stability the trigger MV will turn on oscillator II. Oscillator I is always turned off when oscillator II is turned on, and vice versa. The outputs of these oscillators are led to a mixing circuit from which pulses provided by the respective oscillators are emitted. The output frequency of each of the oscillators (oscillator I and oscillator II) is arranged so that the duration of each pulse corresponds to the duration of a character bit in the magnetic track of the drum D as it is rotated (see arrow) at a predetermined speed. Both of these oscillators should operate substantially at the same frequency.

Let it be assumed that the drum D is rotating and that oscillator I is generating pulses which are emitted from the mixer circuit, the oscillator I being under the control of the trigger MV as previously described. As shown in the drawing of Fig. 1, in the first character position C there is recorded a "2," and in the following character position C there is recorded a "1," a "4," and a "check." These are the data bits which are sensed by the transducer T. As the drum D rotates, the first data bit to be encountered by the transducer T is the bit "2" in the first character position previously mentioned. When the transducer T senses this data bit, a pulse will be delivered through the amplifier A to the trigger MV whereby oscillator I will be turned off and oscillator II will be turned on, so that pulses emitted from the mixer will now be those of oscilator II rather than those of oscillator I as previously assumed. After the data bit is sensed (corresponding to the data bit "2" of the first character position C) oscillator II will then produce a pulse for each succeeding bit of the first character position C; namely, at the "4," "8," "X," "Y," "#" and "check" bit positions of the first character position C. Oscillator II will continue also to produce pulses via the mixer until such time as a new data pulse is sensed by the transducer T. This condition occurs at the first data bit position of the second character position C (the "1" bit position). At this time the transducer again provides a pulse to the amplifier A which provides in turn a pulse to change the trigger MV to its other stable state whereby oscillator II is turned off and oscillator I is turned on to continue providing pulses through the mixer. In this instance, however, oscillator I provides a pulse thereafter only at the "2" bit position, since upon the occurrence of the sensing of the next bit position of the second character position C (the "4" bit position) the transducer T again senses a data bit and, as previously described, again changes the state of the trigger MV, thereby transferring the source of emitted pulses from the mixer from oscillator I to oscillator II. Oscillator II thereafter provides pulses at the "8," "X," "Y," and "#" bits. Thereafter, as the "check" data bit is sensed by the transducer T, the operation previously described occurs once again and the trigger MV changes state, whereupon the oscillators I and II interchange to provide pulses to the mixer.

The advantages of this arrangement are believed to be quite apparent. Since each oscillator always starts in predetermined phase, the timing of succeeding data bit spaces following the sensing of a data bit will be exceedingly accurate. In the arrangement shown, for example, the maximum number of bit spaces which will be timed by any one oscillator is 14 spaces. This is brought about by the conventional arrangement wherein each character position C must contain at least one recorded data bit, in the absence of any informational bits there being a "check" bit recorded. Consequently, it can be seen that if in the first character position a "1" data bit is recorded and no data of significance recorded in the next character position C, there will be a "check" bit recorded in the latter character position, leaving 14 intervening pulse spaces to be provided by the oscillator which is then passing pulses to the mixer circuit. It is readily understandable that this novel arrangement is very effective in overcoming drift which may occur with a large number of bits in a single continuous track (high bit density) wherein the timing is based upon a conventional clock track, particularly where the clock track may be carried by another cyclic carrier mechanically attached to the record carrier upon which the data is recorded. It is also quite obvious that the phasing of the timed pulses wherefrom the intervals of the data bits are measured is determined exclusively by the transducer which is sensing the data pulses. Therefore, when two or more transducers are bearing upon a single recording path, there is no problem in connection with synchronizing the various transducers so that accurate bit recording and reproduction can be obtained. The advantages of this type of timing are further heightened when the bit density of recording is increased and also where the transducers in the process of recording and reproducing are moved to and from the recording medium as in machines such as described in the copending application referred to above.

Figure 2:
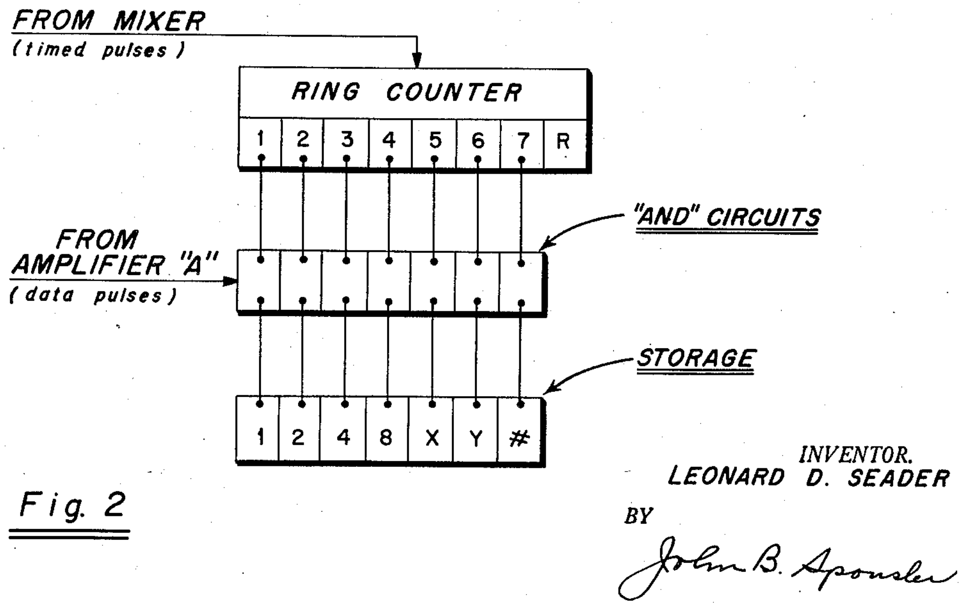
Fig. 2 is a diagrammatic view of a further embodiment based upon Fig. 1, a part of which is incorporated by reference.

Now referring to Fig. 2, there is shown in diagrammatic form a simple arrangement whereby data can be derived from a cyclic record medium such as a drum or disc, making use of the timing arrangement described above. Since both data pulses and timed pulses are available, it is quite simple to provide a ring counter, for example, wherein seven successive pulses are stored from serial entry, and upon receiving the eighth pulse the ring counter is reset. A counter of this kind is provided to receive timed pulses from the mixer of Fig. 1. Leading from the seven positions of the ring counter are connections to a multiple "and" circuit which is controlled by data pulses from the amplifier A of Fig. 1. Consequently, any time that coincidence occurs between a data pulse and a timed pulse the "and" circuit will pass the appropriate data pulse into a storage device which is indicated in Fig. 2. This storage device can take any of several well known forms. For example, in reading from the second character position C of Fig. 1, the following would occur: Assume that oscillator I is delivering timed pulses to the ring counter, a data pulse would be received at the "1" bit position, thereupon transferring the trigger MV so that oscillator I would no longer provide pulses to the mixer and oscillator II would start providing pulses to the mixer. The ring counter receives a pulse, therefore, from oscillator II, and at the same time the "and" circuit receives a data pulse so that a "1" bit would be passed to storage. The ring counter would then receive the next pulse from oscillator II; however, no data pulse would be sensed at the "2" bit position. At the "4" bit position a data pulse would again be received by the transducer T, thereby transferring the production of pulses from oscillator II to oscillator I. Simultaneously, the ring counter would receive a timed pulse from oscillator I and the "and" circuit would receive a data pulse so that a "4" bit would be passed to storage. Thereafter, the ring counter will receive timed pulses at the "8," "X," "Y," "#" bit positions and again at the "check" bit position (the eighth position) the ring counter will be reset, this time, however, by oscillator II which is transferred upon the receiving of a "check" bit pulse by the transducer T into producing the phased, timed pulses to the mixer circuit. It is obvious that other similar arrangements well known in the art could be utilized with equal effect.

Figure 3:
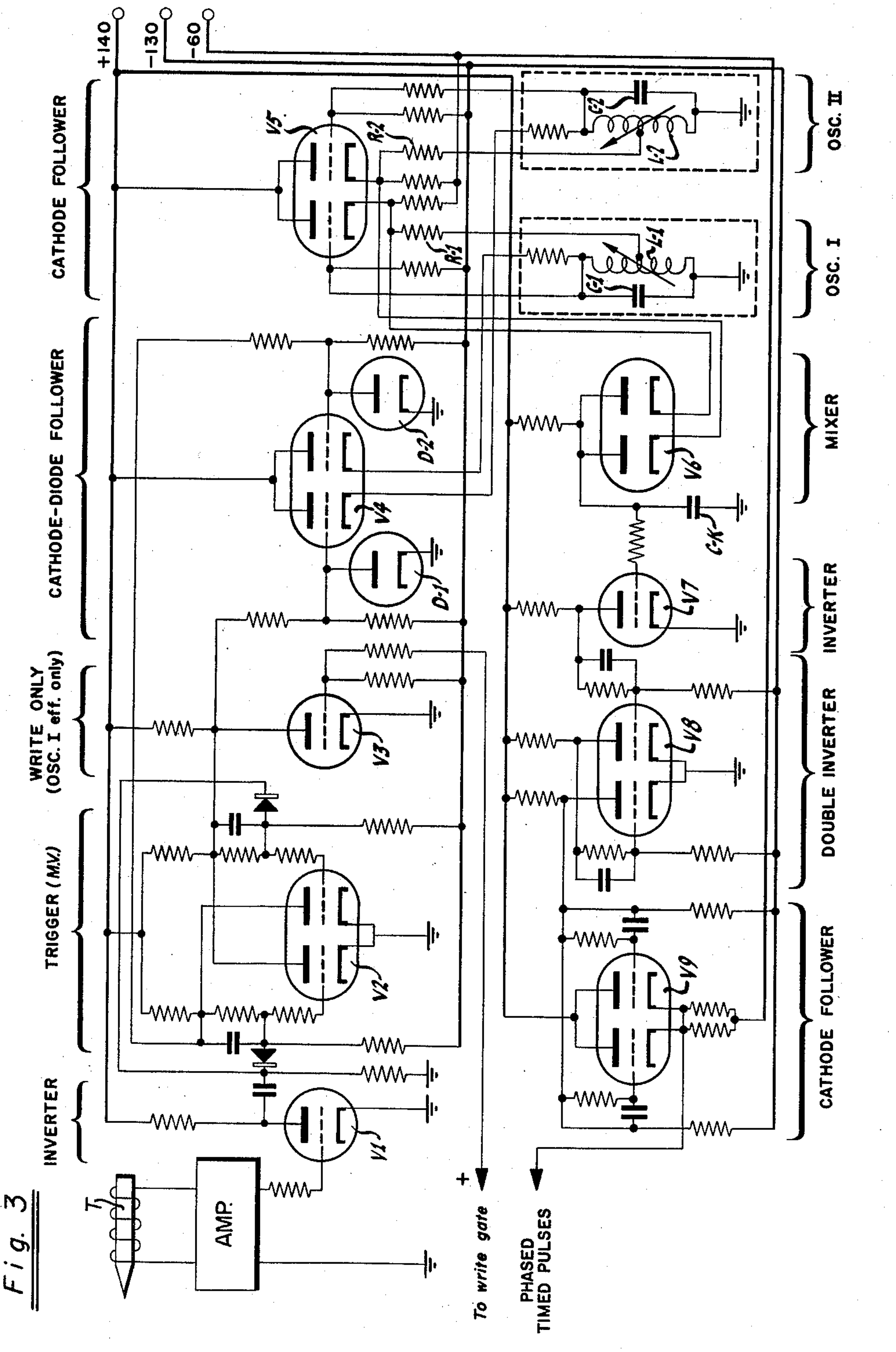
Fig. 3 is a circuit diagram of the principal electronic components of the pulse generator.

Fig. 3 is a circuit diagram of the electronic components previously discussed, together with certain additional features believed to be essential in providing accurate phased, timed pulses. The transducer T previously referred to is connected to a conventional amplifier having its output into an inverter represented by the vacuum tube V1 and its associated circuit. The output of the inverter is fed into a diode coupled trigger comprising the tube V2 and its associated circuit (bi-stable multi-vibrator MV), the output of which is fed to a cathode follower V4 and its associated diodes D1 and D2 which are included to prevent the grid of V4 from going positive. The cathode follower V4 has two outputs, one corresponding to each of the stages of the trigger V2, each of the outputs of V4 going to the respective oscillators I and II. These oscillators are of a conventional type discussed on page 142, volume 19 of the M. I. T. Radiation Laboratory Series ("Waveforms"). Feedback resistors R1 and R2 of the respective oscillators I and II are somewhat critical in value and must be small enough so that the oscillators will start without being pulsed "on" but, nevertheless, large enough so that excessive limiting of the starting of generated pulses does not occur. The correct value of R1 and R2 may be determined by setting the trigger MV (as represented by vacuum tube V2 and its associated circuit) in one stable state and increasing the value of the oscillator resistor R1 or R2 in the oscillator which is then "on" until the pulse generation of that oscillator disappears. The resistor value is then decreased until the oscillator again produces pulses at the predetermined frequency. This is the maximum value for R1 or R2, as the case may be. The optimum value of R1 or R2 should be a value slightly under the maximum value, and roughly may be said to be that value which produces a 0.2% decrease in the oscillator frequency. The adjustment of R1 or R2, as the case may be, should be made with the oscillator operating at the desired frequency corresponding to the timed pulse interval which is necessary for operation.

The outputs of the oscillators I and II are fed into a cathode follower represented by the vacuum tube V5 and its associated circuit from which the oscillator pulses of each oscillator are fed into a mixer represented by vacuum tube V6. The output of the mixer V6 is shunted by a capacitor C–K in order to prevent spikes in the waveforms of the output where the frequency of the data bit is slightly lower than the output of the oscillator then providing the phased, timed pulses. The output of the mixer is passed through an inverter V7 and a double inverter V8 into a final cathode follower V9, the output of which provides the phased, timed pulses which are used for timing the data bits.

Figure 4:
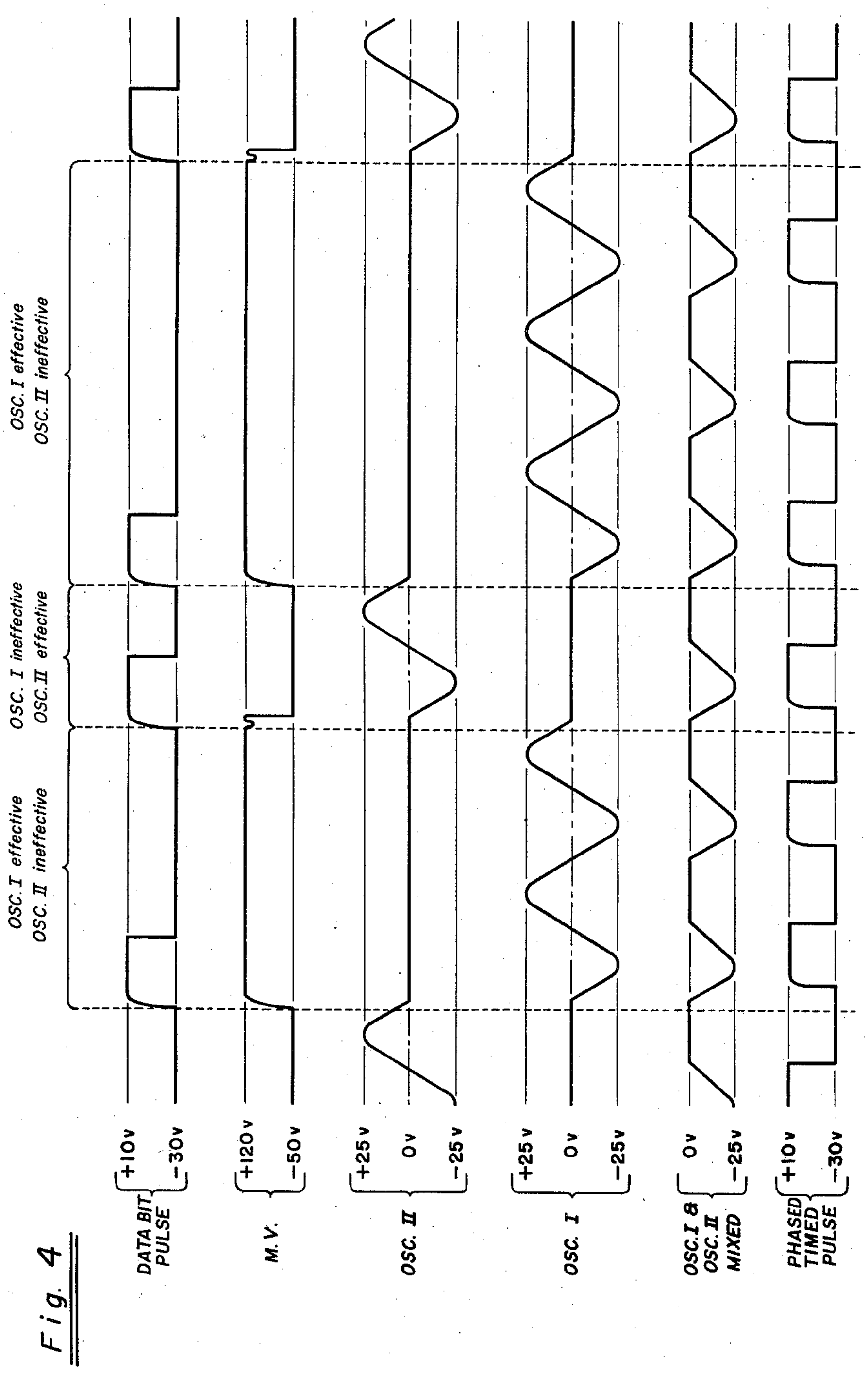
Fig. 4 is a chart of the waveforms obtained from the circuit of Fig. 3.

Fig. 4 gives the wave patterns of the various portions of the circuit of Fig. 3. The data bit pulses are shown at the top of the figure and the multivibrator (trigger) pulses corresponding thereto are shown with respect to oscillator I. A similar set of wave patterns is obtained (not shown) when the other stable state of the trigger MV receives data bit pulses to cause oscillator II to produce phased, timed pulses. The outputs of the two oscillators I and II are mixed so that the output of the clock pulse generator appears to be one continuous train of pulses. This is shown in the next to the last wave pattern in Fig. 4. Since the oscillators always start with a predetermined phase, phase correction is inherent in the switching of the trigger MV. Initially, the frequency of the two oscillators may be adjusted to provide the necessary gap (approximately 4%) in the magnetic track which is being written upon. Only one oscillator at a time is used in recording or writing upon the magnetic track. This is accomplished through the "write only" section of Fig. 3 which is shown in connection with having oscillator I effective only. Normally, when the write gate of the magnetic recording device goes positive, the vacuum tube V3 will clamp the trigger MV (via its connection to one of the grids of the vacuum tube V2) so that only one of the oscillators can function to generate pulses. In this manner all of the recording or writing upon the magnetic record is accomplished under the control of one oscillator. It is immaterial which of the oscillators is controlled in this manner. The final output of the circuit of Fig. 3 is shown in the waveform labeled "Phased, timed pulses" (last waveform of Fig. 4). There is a slight time delay in the circuit of Fig. 3 whereby the phased, timed pulses lag the data bit pulses by approximately a few microseconds; however, since this delay is constant, there is little, if any, difficulty encountered in this respect. The effect of the capacitor C–K which shunts the output of the mixer can be noted in the waveform of the combined oscillators I and II shown in Fig. 4 wherein the slope of the rising pulse is less than the slope of the falling pulse. Multivibrators may be used in lieu of the oscillators I and II; however, better frequency stability is obtained by using the type of pulse generation shown in Fig. 3 wherein the so-called "L/C" type of oscillator is employed.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a recording device wherein data is recorded and reproduced selectively under control of timed pulses, means for sensing said data, a pair of generators of timed pulses, and means under control of the said sensing means for switching from one of said generators to the other whenever the said sensing means encounters data whereby timed pulses are emitted alternatively from the said generators precisely phased with the occurrence of the said data.

2. In a recording device including a moving recording medium whereon increments of data are recorded and reproduced selectively under control of timed pulses, means for sensing said data, a pair of pulse generators, and means under control of said sensing means for switching from one to the other of said generators each time an increment of said data is sensed whereby pulses are delivered alternatively from said geenrators in phase with said data.

3. In a recording device including a cyclic carrier upon which data is recorded selectively under control of timing pulses, means for sensing said data, a pair of generators of timing pulses, and means under control of said sensing means for switching on one or the other of said generators to provide timing coordination for said data whenever it is sensed.

4. A timed pulse generator for selectively controlling the recording and reproduction of data pulses upon a moving record comprising a pair of pulse generators, data pulse sensing means, and means under control of the said sensing means for switching from one to the other of said generators whenever a data pulse is sensed to provide a series of timing pulses coordinated with said data pulses alternatively from the said generators.

5. In a magnetic recording device wherein data bits are recorded upon a moving magnetic carrier in timed relation to the motion thereof, a data sensing means, a pair of pulse generators each providing pulses at predetermined equal intervals, and means under control of the said sensing means for switching from one to the other of said generators each time a data bit is sensed whereby the first pulse output of each said generator is synchronized with a said data bit.

6. In a magnetic recording device wherein data bits are recorded upon a moving magnetic carrier in timed relation to the motion thereof, a data sensing means, a pair of pulse generators each providing pulses at predetermined equal intervals corresponding to the recorded data bit intervals, and means under control of the said sensing means for switching from one to the other of said generators each time a data bit is sensed whereby the first pulse output of each said generator is synchronized with a said data bit.

7. In a magnetic recording device wherein data is recorded upon a moving magnetic carrier at bit positions having intervals in timed relation to the motion thereof, data sensing means, a pair of pulse generators each capable of providing pulses at predetermined equal intervals corresponding in time to the said bit positions and means under control of the said sensing means for switching from one to the other of said generators each time data is sensed at a said bit position whereby a series of timed pulses corresponding to the said bit intervals is alternatively provided from each said generator, the first pulse of each series being in precise phase with a sensed data bit.

8. In a magnetic recording device wherein data is recorded upon a moving magnetic carrier at bit positions having intervals in timed relation to the motion thereof, data sensing means, a pair of pulse generators each capable of providing pulses at predetermined equal intervals corresponding in time to the said bit positions, one of said generators normally being active to produce pulses and the other said generator being inactive, and means under control of the said sensing means for disabling the active generator and enabling the inactive generator alternatively to produce pulses whenever data is sensed at a said bit position whereby a series of timed pulses corresponding to the said bit intervals is alternatively provided from each said generator, the first pulse of each series being in precise phase with a sensed data bit.

9. In a magnetic recording device having data recorded at discrete bit positions on a cyclic carrier in timed relation to the rate of rotation thereof, a magnetic transducer for sensing said data, a bi-stable multivibrator under control of said transducer so that whenever data is sensed at a said position the said multivibrator changes its condition of stability, a pair of oscillators each providing periodic pulses spaced at intervals corresponding to the said data bit positions, and a mixer circuit providing a common output for said oscillators, the said oscillators being under control of the said multivibrator so that one of said oscillators delivers pulses to the said mixer at one condition of stability of said multivibrator and the other oscillator delivers pulses to the said mixer at the other condition of stability of said multivibrator whereby a series of timed pulses is provided from the said mixer in phase with the said bit positions at each occurrence of data at a said bit position.

10. In a magnetic recording device having data recorded at discrete bit positions on a cyclic carrier in timed relation to the rate of rotation thereof, a magnetic transducer for sensing said data, a trigger circuit under control of said transducer so that whenever data is sensed at a said position the said trigger changes its condition of stability, a pair of multivibrators each providing periodic pulses spaced at intervals corresponding to the said data bit positions, and a mixer circuit providing a common output for said multivibrators, the said multivibrators being under control of the said trigger so that one of said multivibrators delivers pulses to the said mixer at one condition of stability of said trigger and the other multivibrator delivers pulses to the said mixer at the other condition of stability of said trigger whereby a series of timed pulses is provided from the said mixer in phase with the said bit positions at each occurrence of data at a said bit position.

11. A pulse generator for providing timed pulses in phase with data pulse positions of a magnetic track in a moving magnetic recording carrier comprising a data sensing transducer, a trigger circuit having two stable states of conductivity, a pair of oscillators each capable of generating timed pulses periodically coinciding with said data pulse positions, and a mixer circuit providing a common output for the said oscillators, the said trigger circuit being arranged to actuate the said oscillators alternately according to its state of conductivity and the said transducer being arranged to shift the conductivity of said trigger each time data is sensed at a said position.

12. In a recording device wherein data is recorded and reproduced selectively under control of timed pulses, means for sensing said data, a plurality of generators of timed pulses, and means under control of the said sensing means for switching from one to another of said generators whenever said sensing means encounters data whereby timed pulses are emitted from the said selected generator precisely in phase with the occurrence of the said data.

13. In a recording device wherein data is recorded and reproduced selectively under control of timed pulses, means for sensing said data, a generator of timed pulses, and means under control of said sensing means for regulating said generator to produce pulses in precise phase with the occurrence of said data.

References Cited in the file of this patent

UNITED STATES PATENTS

| | | |
|---|---|---|
| 2,700,149 | Stone | Jan. 18, 1955 |
| 2,700,155 | Clayden | Jan. 18, 1955 |
| 2,729,809 | Hester | Jan. 3, 1956 |